UNITED STATES PATENT OFFICE.

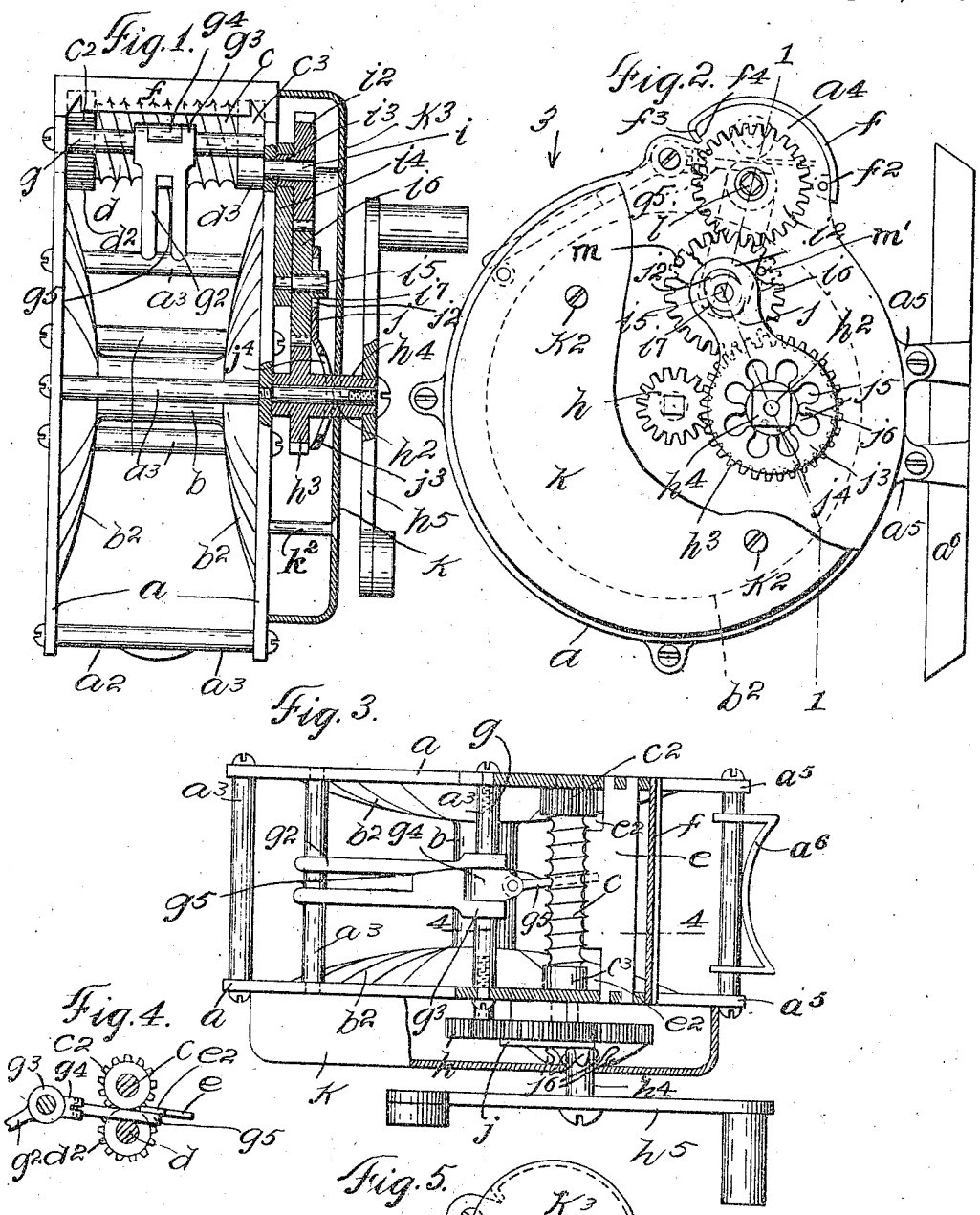

JOHN A. JERNSTEDT, OF JERSEY CITY, NEW JERSEY.

FISHING-REEL.

1,001,857. Specification of Letters Patent. Patented Aug. 29, 1911.

Application filed October 20, 1909. Serial No. 523,733.

*To all whom it may concern:*

Be it known that I, JOHN A. JERNSTEDT, a citizen of the United States, and residing at Jersey City, in the county of Hudson and State of New Jersey, have invented certain new and useful Improvements in Fishing-Reels, of which the following is a specification, such as will enable those skilled in the art to which it appertains to make and use the same.

The object of my invention is to provide a fishing reel with improved means for winding the line on the spool in a perfectly even manner without any attention from the operator and which will not interfere with the operation of casting or throwing out the line; a further object being to provide a fishing reel with an improved gearing mechanism for operating the spool of the reel and by which the devices for winding the line on the spool are also operated; and with this and other objects in view, the invention consists in a fishing reel constructed and operated as hereinafter described and claimed.

The invention is fully disclosed in the following specification, of which the accompanying drawing forms a part, in which the separate parts of my invention are designated by suitable reference characters in each of the views, and in which:—

Figure 1 is a sectional plan view of a fishing reel provided with my improvement, part of the construction being shown in section on the line 1—1 of Fig. 2;—Fig. 2 a side view of the reel with part of one side of the casing broken away and also showing the means for connecting the reel with the pole or rod;—Fig. 3 a view looking in the direction of the arrow 3 of Fig. 2 with part of the construction shown in section;—Fig. 4 a partial section on the line 4—4 of Fig. 3, and;—Fig. 5 a view similar to Fig. 2, but showing that part of the casing which is broken away in Fig. 2 or a portion thereof.

In the drawing forming part of this specification, I have shown the main frame of a fishing reel which is composed of side plates $a$ connected and spaced by rods $a^2$ on which are mounted sleeves $a^3$ and the side plates $a$ are provided at the front of the reel, or that part thereof which is the front when said reel is connected with a pole, with forwardly directed and approximately semi-circular ears $a^4$ and the bottom of the frame of the reel is provided with ears $a^5$ with which is connected an attaching device $a^6$ whereby the reel may be secured to a rod or pole in the usual manner. Mounted in the center of the frame is the usual spool comprising a hub $b$ and side heads $b^2$ and mounted between the ears $a^4$ of the side plates $a$ of the frame are two shafts $c$ and $d$ provided with worm-threads, both of which are right threads, and the left hand ends of which are provided with intermeshing gears $c^2$ and $d^2$, respectively, and the right hand ends of which are provided with collars $c^3$ and $d^3$ and mounted in front of the worm-gears $c$ and $d$ is a transverse horizontal plate $e$ the end portions of which are cut out to form notches or recesses $e^2$ in the front edge thereof, and a spring metal cap $f$ is pivoted at $f^2$ and provided at its free edge with inwardly directed lugs or projections $f^3$ adapted to enter corresponding recesses $f^4$ formed in the top edges of the ears $a^4$ of the side plates $a$ of the frame and said cap may be swung into the closed position as shown in Fig. 2 so as to cover or inclose the worm-thread shafts $c$ and $d$ or said cap may be turned backwardly or downwardly on its pivotal connection $f^2$ whenever desired.

Mounted on a transverse rod $g$ supported between the side plates $a$ of the main frame and over the shafts $c$ and $d$ is a forked guide device $g^2$ provided with a yoke-shaped head $g^3$ and mounted on said rod $g$ between the sides of the yoke-shaped guide head thereof is a block $g^4$ to which is pivoted a finger $g^5$ which passes between the shafts $c$ and $d$ and the free end of which is adapted to slide either above or below the inner edge of the plate $e$ and the forked device $g^2$ is adapted to be turned backwardly and rest on one of the cross bars or rods of the frame as shown at $g^5$ in Figs. 1, 2 and 3 or said forked member may be thrown outwardly in the operation of casting or throwing out the line as hereinafter described.

The shaft on which the spool composed of the parts $b$ and $b^2$ is mounted is provided at the right hand side of the frame with a pinion $h$, below which is a stub-shaft $h^2$ which is secured in the corresponding frame plate and on which is mounted a gear wheel $h^3$ which meshes with the pinion $h$ and is provided with a hub $h^4$ which passes through the plate $k$ and is provided with a crank $h^5$.

Connected with the shaft $i$ of the worm-threaded roller $d$ which projects through the right hand frame plate $a$ is a gear $i^2$ provided on its inner side with a hub $i^3$, on which is mounted an arm $i^4$ provided at its free end with a spindle $i^5$, on which is mounted a gear wheel $i^6$ which meshes with the gear wheel $i^2$ and which is also adapted to mesh with the gear wheel $h^3$, and the gear wheel $i^6$ is provided with an outwardly directed hub $i^7$ and mounted on the hub $i^7$ is a friction plate $j$ provided with an oblong slot or opening $j^2$ through which the hub $i^7$ of the gear $i^6$ passes, and the friction plate $j$ is provided with a circular head $j^3$ having a central opening $j^4$ through which the hub $h^4$ of the gear $h^3$ passes and around which are radial recesses $j^5$ forming inwardly directed spring tongues $j^6$.

The head $j^3$ of the friction plate $j$ is concavo-convex in cross-section and the convex surface thereof is directed outwardly, and mounted on the corresponding frame plate $a$ and inclosing the gears $i^2$, $i^6$ and $h^3$ is a cap $k$ which is secured to said frame plate by screws or other devices $k^2$, and the convex outer side $j^3$ of the friction plate $j$ bears on the cap $k$ and said cap $k$ is provided at the front edge thereof with a projecting member $k^3$ which incloses the gear $i^2$.

In practice, when it is desired to wind the line on the reel or on the spool $b$—$b^2$, the fork guide piece $g^2$ is turned into the position shown in Figs. 1 to 3, inclusive, and the said line is passed through said guide piece and connected to the hub of the spool $b$—$b^2$. If now, the crank or handle $h^5$ be turned to the right, the spool will be rotated so as to wind the line thereon and the friction plate $j$ will throw the gear $i^6$ into mesh with the gear $h^3$ and said gear $i^6$ being normally in mesh with the gear $i^2$, the worm-threaded shafts $c$ and $d$ will be turned, as will be readily understood. If in this operation the finger $g^5$ is below the plate $e$ as shown in Figs. 3 and 4, the said finger will follow the thread of the shaft $d$ until it reaches the right hand end of said shaft when it will strike the collar $d^3$ of said shaft and the thread will throw said finger up through the corresponding notch or recess $e^2$ in the corresponding end of the plate $a$, and as the winding continues, the finger $g^5$ will engage the thread of the shaft $c$ and will be carried along said shaft $c$ in the opposite direction until it reaches the opposite end of said shaft when it will drop down and again engage the thread of the shaft $d$, and in this way, the fork guide piece $g^2$ and finger $g^5$ will be made to travel back and forth on the transverse head $g$, and in this operation the line will be truly and evenly wound in separate layers on the spool $b$—$b^2$. In the operation of casting or throwing the line out, the gear $h^3$ is turned to the left and the friction plate $j$ throws the gear $i^6$ out of mesh with the said gear $h$ and the shafts $c$ and $d$ are not operated, and in this operation the fork guide $g^2$ is also turned forwardly, as will be readily understood.

The right hand frame plate $a$ is provided with stop-pins $m$ and $m'$ which limit the movement of the arm $i^4$ and also the movement of the gear $i^6$ occasioned by the friction plate $j$ as hereinbefore described.

Having fully described my invention, what I claim as new and desire to secure by Letters Patent, is:—

1. A fishing reel comprising the usual frame and spool mounted therein, worm-threaded shafts mounted in front of said spool, said shafts being provided at one end with intermeshing gears and at their opposite ends with collars, a guide plate mounted in front of said shafts and the front edge of which is provided at its opposite ends with recesses, a forked line guide rotatably mounted on a transverse frame rod and movable longitudinally thereof, and a pivoted finger device mounted in connection with said forked line guide and movable therewith on said rod and the free end of which passes between said shafts.

2. A fishing reel provided with the usual spool, two worm shafts geared in connection at one end and the opposite end of one of which is provided with a gear, a pinion connected with the shaft of the spool, a main crank-operated gear mounted adjacent to said pinion and meshing therewith, an arm pivoted on the support of the worm shaft gear, an intermediate gear mounted on the free end of said arm and meshing with the worm shaft gear and adapted to mesh with the crank-operated gear, and a friction plate pivoted on and movable radially of the intermediate gear and provided with a convex head through which the hub of the crank-operated gear passes, and a cap secured to the frame of the reel and inclosing said gears and bearing on the head of said friction plate.

3. A fishing reel provided with two worm shafts geared in connection at one end and the opposite ends of which are provided with collars, a guide plate mounted in front of said shafts and the front edge of which extends inwardly toward the space between said shafts and is provided at its opposite ends with recesses, a forked guide piece mounted rearwardly of said shafts and movable transversely of the frame of the reel, and a pivoted finger mounted in connection with said guide piece and movable therewith and extending forwardly between said shafts.

4. In a fishing reel, two worm shafts one of which is provided with a gear, a pinion connected with the shaft of the spool of the reel, a crank-operated gear meshing with said pinion, an arm pivoted on the support of the worm shaft gear, an intermediate gear mounted in connection with said arm and meshing with said worm shaft gear and adapted to mesh with the crank-operated gear, a cap inclosing said gears, and a friction plate pivoted on and movable radially of the intermediate gear and having a head through which the hub of the crank-operated gear passes and on which said cap bears.

JOHN A. JERNSTEDT.

Witnesses:
 OSCAR A. JOHNSON,
 W. H. DAVIS.